US007916925B2

(12) United States Patent
Mount et al.

(10) Patent No.: US 7,916,925 B2
(45) Date of Patent: Mar. 29, 2011

(54) SYSTEM AND METHOD FOR GENERATING MAGNETIC INK CHARACTER RECOGNITION (MICR) TESTING DOCUMENTS

(75) Inventors: Cheryl Mount, Westerville, OH (US); Akshay Pradhan, New Albany, OH (US); Sheryl F. Tucker, Ft. Worth, TX (US); Danielle O. Garvey, Cardington, OH (US); Dennis C. Barry, Gahanna, OH (US); Brenda Goodwin, Westerville, OH (US); Tammy Radvanyi, Galena, OH (US); Linda M. O'Brien, Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 812 days.

(21) Appl. No.: 11/853,434

(22) Filed: Sep. 11, 2007

(65) Prior Publication Data
US 2008/0193008 A1    Aug. 14, 2008

Related U.S. Application Data

(60) Provisional application No. 60/889,114, filed on Feb. 9, 2007.

(51) Int. Cl.
*G06K 9/00* (2006.01)
*G06Q 40/00* (2006.01)
(52) U.S. Cl. ............................ 382/139; 382/189; 705/45
(58) Field of Classification Search .................. 382/100, 382/112–116, 135, 136, 137, 138, 139, 140, 382/155, 168, 181–190, 232, 254, 274, 276, 382/305, 312, 321; 358/1.1; 705/45; 283/67; 194/210; 235/454; 156/187
See application file for complete search history.

(56) References Cited

U.S. PATENT DOCUMENTS
3,653,480 A * 4/1972 Yamamoto et al. ........... 194/210
(Continued)

FOREIGN PATENT DOCUMENTS
EP         421808         4/1991
(Continued)

OTHER PUBLICATIONS

Annual Report Pursuant to Sectin 13 or 15(d) of The Securities Exchange Act of 1934, Form 10-K, Intelidata Technologies Corporation, Fiscal Year Ended Dec. 31, 2001.

(Continued)

*Primary Examiner* — Seyed Azarian
(74) *Attorney, Agent, or Firm* — Hunton & Williams, LLP

(57) ABSTRACT

A system and method for accessing data to generate documents for use in MICR line testing. The system comprises a MICR testing station for testing MICR processing. The MICR testing station comprises a MICR line testing module for generating at least one MICR testing document for use in testing MICR processing. The MICR line testing module further comprises: (1) an application determination module for determining an application based on a bank selection provided by a tester, (2) a routing/transit number determination module for determining a routing/transit number based on the bank and the application determined, and (3) a tran code determination module for determining a tran code based on the routing/transit number determined; and at least one client station connected to the MICR testing station via a communications network, the at least one client station being used by at least one tester to provide particulars about at least one MICR line.

16 Claims, 10 Drawing Sheets

U.S. PATENT DOCUMENTS

| | | | |
|---|---|---|---|
| 4,205,780 A * | 6/1980 | Burns et al. ................ 235/454 |
| 4,264,808 A | 4/1981 | Owens et al. |
| 4,321,672 A | 3/1982 | Braun et al. |
| 4,396,985 A | 8/1983 | Ohara |
| 4,495,018 A * | 1/1985 | Vohrer ........................ 156/187 |
| 4,617,457 A | 10/1986 | Myers et al. |
| 4,672,377 A | 6/1987 | Murphy |
| 4,700,055 A | 10/1987 | Kashkashian, Jr. |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A * | 12/1990 | Josephson ..................... 283/67 |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A * | 10/1991 | Beizer ........................ 382/305 |
| 5,080,748 A | 1/1992 | Bonomi |
| 5,111,395 A * | 5/1992 | Smith et al. .................... 705/45 |
| 5,121,945 A | 6/1992 | Thomson et al. |
| 5,122,950 A | 6/1992 | Mee et al. |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn et al. |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Eccles et al. |
| 5,757,917 A | 5/1998 | Rose et al. |
| 5,770,843 A | 6/1998 | Rose et al. |
| 5,774,553 A | 6/1998 | Rosen |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,825,003 A | 10/1998 | Jennings et al. |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,883,810 A | 3/1999 | Franklin et al. |
| 5,884,288 A | 3/1999 | Chang |
| 5,897,625 A | 4/1999 | Gustin |
| 5,898,157 A | 4/1999 | Mangili et al. |
| 5,903,878 A | 5/1999 | Talati et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |

| | | |
|---|---|---|
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,026,388 A | 2/2000 | Liddy et al. |
| 6,029,139 A | 2/2000 | Cunningham et al. |
| 6,029,141 A | 2/2000 | Bezos et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,374,235 B1 | 4/2002 | Chen et al. |
| 6,393,409 B2 | 5/2002 | Young et al. |
| 6,405,173 B1 | 6/2002 | Honarvar et al. |
| 6,411,942 B1 | 6/2002 | Fujimoto |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,446,072 B1 | 9/2002 | Schulze et al. |
| 6,464,134 B1 | 10/2002 | Page |
| 6,490,568 B1 | 12/2002 | Omara et al. |
| 6,493,685 B1 | 12/2002 | Ensel et al. |
| 6,535,896 B2 | 3/2003 | Britton et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,704,714 B1 | 3/2004 | O'Leary et al. |
| 6,721,715 B2 | 4/2004 | Nemzow |
| 6,825,940 B1 | 11/2004 | Wu et al. |
| 6,954,896 B1 | 10/2005 | Dodrill et al. |
| 6,968,319 B1 | 11/2005 | Remington et al. |
| 6,970,259 B1 | 11/2005 | Lunt et al. |
| 6,999,943 B1 | 2/2006 | Johnson et al. |
| 7,024,385 B1 | 4/2006 | Adcock et al. |
| 7,062,456 B1 | 6/2006 | Riehl et al. |
| 7,104,443 B1 | 9/2006 | Paul et al. |
| 7,146,344 B2 | 12/2006 | Wankmueller |
| 7,177,836 B1 | 2/2007 | German et al. |
| 7,742,178 B2 * | 6/2010 | Ducato et al. .................. 358/1.1 |
| 2001/0018739 A1 | 8/2001 | Anderson et al. |
| 2001/0032139 A1 | 10/2001 | Debonnett, Jr. |
| 2001/0037309 A1 | 11/2001 | St. Vrain |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0037002 A1 | 2/2003 | Higgins et al. |
| 2003/0046218 A1 | 3/2003 | Albanese et al. |
| 2003/0097335 A1 | 5/2003 | Muskowitz et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0187789 A1 | 10/2003 | Karas et al. |
| 2003/0191710 A1 | 10/2003 | Green et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 | 4/2004 | Talbert et al. |
| 2004/0201735 A1 | 10/2004 | Baron |

| | | |
|---|---|---|
| 2004/0228514 A1 | 11/2004 | Houle et al. |
| 2005/0033690 A1 | 2/2005 | Antognini et al. |
| 2005/0177480 A1 | 8/2005 | Huang |

FOREIGN PATENT DOCUMENTS

| | | |
|---|---|---|
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Blockbuster running test of a stored value card, The American Banker, Sep. 1, 1995.
CES/NaBANCO introduces stored value card technology blockbuster video is first merchant partner, Business Wire, Inc., Jan. 15, 1996.
Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments Ills, The American Banker, vol, 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.
Michael Miller, The Complete Idiot's Guide to Ebay Online Auctions, Copyright Jul. 1999.

* cited by examiner

150

| Bank No. | Application Type | Serial No. | Routing/Transit No. | Account No. | Tran. Code | Amount |
|---|---|---|---|---|---|---|
| 1 | 1 | 1234567890 | DDA | 0987654321 | DTC-6 | -100.00 |
| 1 | 1 | 2345678901 | DDA | 9876543210 | DTC-6 | 100.00 |
| 1 | 1 | 3456789012 | 500101027 | 10099998 | CTC-2 | 160.00 |
| 1 | 1 | 4567890123 | 500101027 | 53554312 | DTC-6 | -160.00 |

Figure 1a

SYSTEM AND METHOD FOR GENERATING MAGNETIC INK CHARACTER RECOGNITION (MICR) TESTING DOCUMENTS

CROSS-REFERENCE TO RELATED APPLICATIONS

This application claims priority to provisional application Ser. No. 60/889,114, filed Feb. 9, 2007, entitled "SYSTEM AND METHOD GENERATING MAGNETIC INK CHARACTER RECOGNITION (MICR) TESTING DOCUMENTS,"herein incorporated by reference in its entirety.

FIELD OF THE INVENTION

The present disclosure is directed to systems and methods for generating, more specifically for generating MICR testing documents that contain error-free lines or transactions.

BACKGROUND OF THE INVENTION

In the year 2000, an estimated 70 billion checks were written in the United States alone. This translates into approximately 270 million checks being processed every business day. Monitoring and tracking the flow of checks is a complex procedure that is highly error-prone.

The check processing system is based on the special numbers and symbols on the bottom of checks and their ability to be recognized magnetically by devices called readers or sorters. These numbers and symbols—and the technology that process them—are generally referred to as Magnetic Ink Character Recognition (or "MICR"). MICR is a character recognition system that uses special ink and characters to identify banks and accounts to or from which funds will be deposited or withdrawn. When a document (e.g., check) that contains this ink needs to be read, it passes through a machine (e.g., sorter) which magnetizes the ink and then translates the magnetic information into characters.

When properly implemented, MICR provides a secure, high-speed method of scanning and processing information. However, when a reader/sorter cannot process the MICR number and characters automatically, or the MICR number and characters are incorrect, a check may be rejected. The MICR information must then be manually re-keyed by someone on a special encoding device, a correction label applied to the bottom of the check, and the check resubmitted. Common MICR errors include the listing of applications types (e.g., deposit, withdrawal, and loan systems implemented by a bank) on the MICR line that do not correspond to the customer's selected bank. For example, if a customer bank is in Illinois, an check processing error will result if the application type (e.g., deposit system) listed on the MICR line does not correspond to the deposit system actually used by the Illinois bank. In such a case the MICR line numbers would not match up, and the check will not be processed properly.

To reduce the likelihood of errors, quality assurance testing on MICR lines is typically conducted. The process currently involves the generation of MICR "decks" which consist of spreadsheets that include credit and debit entries or transactions that simulate customer activity (e.g., deposit, withdrawal, etc.). A particular deck may include an amount of money to be deposited into a particular account at a particular bank. Test decks are fed into a MICR system to verify system integrity and detect any errors that may be occurring during processing.

However, current MICR line testing suffers from several notable drawbacks. For one thing, the process is completely manual and thus error-prone. MICR decks include large amounts of data that must be manually entered onto a spreadsheet by a team member. Once completed, the spreadsheet is delivered to other team members who conduct quality review and perform necessary edits. During the review and editing process, each line must be carefully reviewed to ensure that all related data has been entered correctly. If an error is located, the reviewer must sift through a large binder of information to identify the correct data or information, and then must take steps to correct the mistake. Needless to say, the level of detail required to check for errors makes the review process itself vulnerable to error, all of which further compounds the problem.

These and other problems exist.

SUMMARY OF THE INVENTION

An object of the present disclosure is to overcome the aforementioned and other drawbacks existing in prior art systems and methods.

According to numerous embodiments, the various systems and methods described herein may comprise a MICR test tool for accessing, creating, revising or modifying documents or decks of MICR lines or transactions that simulate customer credit or debit transactions. In some embodiments, the decks may be used to conduct MICR testing procedures relating to the sorting and processing of checks. In some embodiments, the MICR test tool may comprise an online, web-based tool designed to generate test decks containing error-free MICR lines or transactions that are found on the bottom of checks, for example, and are used by routers or sorters to determine the relevant account to or from which funds will be deposited or withdrawn. Common errors found on MICR lines include the listing of applications (e.g., DDA and SBF—deposit, withdrawal and loan systems, for example) not offered by a particular bank, and the inclusion of incorrect bank name or number, account number, serial numbers, routing or transit number, or tran codes. A tran code is used in a demand deposit account (DDA) to identify the item type to the system (e.g., differentiate between a check and a deposit). By ensuring the decks—and more specifically the lines or transactions within a deck—are error-free, a testing team may stop spending extensive time editing MICR decks and focus more on executing testing procedures as planned. Accordingly, the various systems and methods described herein reduce processing time as individual deck files may be stored for future use and modified as necessary.

In some embodiments, the MICR test tool may comprise a MICR testing station that further comprises a MICR line testing module. The MICR line testing module may include additional modules that present a tester, for example, with various interfaces that solicit information relating to the creation, editing, revision or modification of MICR decks, and more specifically MICR lines or transactions that simulate customer credit or debit transactions. In some embodiments, a MICR line or transaction may comprise data or information that may be used during processing to determine which bank and/or account funds will be deposited to or withdrawn from. For example, a MICR line or transaction may comprise a bank number, an application type, serial number, routing/transit number, account number, tran code, and amount. A deck may comprise a series of MICR lines or transactions which may collectively result in a total credit amount, total debit amount, and balance (e.g., credits+debits).

In some embodiments, the MICR testing station may be accessed by a MICR tester to generate MICR decks based on inputs provided. For example, interfaces may query the tester for particular information about a MICR line or transaction, such as bank name, serial number, account, number, and amount of the transaction. In some embodiments, the various and methods described herein may determine particulars about the MICR line or transaction based on information provided. For example, upon the tester selecting a bank to associated with a MICR line or transaction, the various systems and methods described herein may identify application types that correspond to such bank. In some embodiments, drop-down menus may be used to ensure that banks and applications are properly correlated. For example, if a user selects a particular bank, drop-down menus may only offer applications that are associated with the selected bank. The tester may then select the desired application type from the list deemed to be relevant to the selected bank. Other particulars of a MICR line or transaction may be similarly determined. In this way, the various systems and methods of the invention directly improve upon the error-prone procedures currently utilized to test MICR processing.

According to one embodiment, a system for accessing and generating documents for use in MICR line testing is provided. The system comprises a MICR testing station for testing MICR processing, the MICR testing station comprising: a MICR line testing module for generating at least one MICR testing document for use in testing MICR processing, the MICR line testing module further comprising: (1) an application determination module for determining an application based on a bank selection provided by a tester, (2) a routing/transit number determination module for determining a routing/transit number based on the bank and the application determined, and (3) a tran code determination module for determining a tran code based on the routing/transit number determined; and at least one client station connected to the MICR testing station via a communications network, the at least one client station being used by at least one tester to provide particulars about at least one MICR line.

In another embodiment, a method for accessing data to generate at least one transaction comprising part of at least one document for use in MICR testing is provided. The method comprises the steps of receiving a bank selection signal from a tester selecting a bank associated with a MICR line transaction; determining at least one related application associated with the bank selected by the tester, the at least one related application being determined by an application determination module associated with a MICR testing station; receiving an application selection signal from the tester selecting an application associated with the MICR line transaction, the application being selected from the at least one related application determined to be associated with the bank; determining at least one related routing/transit number associated with the bank and/or the application selected by the tester, the at least one related routing/transit number being determined by an routing/transit number determination module associated with a MICR testing station; receiving a routing/transit number selection signal from the tester selecting a routing/transit number associated with the MICR line transaction, the routing/transit number being selected from the at least one related routing/transit number determined to be associated with the bank and/or the application; determining a tran code that corresponds to the routing/transit number selected by the tester, the tran code being determined by an tran code determination module associated with a MICR testing station; and associating the tran code with the MICR line transaction.

In yet another embodiment, a system for accessing and generating documents for use in MICR line testing is provided. The system comprising: a MICR testing station for testing MICR processing, the MICR testing station comprising: a MICR line testing module for generating at least one MICR testing document for use in testing MICR processing, the MICR line testing module further comprising: (1) an application determination module for determining an application based on a bank selection provided by a tester, (2) a routing/transit number determination module for determining a routing/transit number based on the bank and the application determined, (3) a tran code determination module for determining a tran code based on the routing/transit number determined, (4) a deck selection module for selecting a deck to create or revise, wherein the deck selection module further comprises a search module for searching existing decks, a build new deck module for creating a new deck, and an open existing deck for opening and revising, modifying or editing an existing deck, (5) a view deck module for viewing selected decks, wherein the view deck module further comprises a search module for searching existing decks, a copy deck module for copying an existing deck, an add items module for adding transactions to a deck, a save deck module for saving a deck, and a submit deck module for submitting a deck for MICR testing, (6) a view item module for viewing at least one transactions within a deck, wherein the view item module further comprises a search module for searching existing decks, a view deck module for viewing at least one deck associated with the at least one transaction, and a post item module for posting the at least one transaction to the deck; and at least one client station connected to the MICR testing station via a communications network, the at least one client station being used by at least one tester to provide particulars about at least one MICR line.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 1a is a table 150 illustrating a MICR deck, according to the an exemplary embodiment.

DETAILED DESCRIPTION OF THE INVENTION

Figure 1:
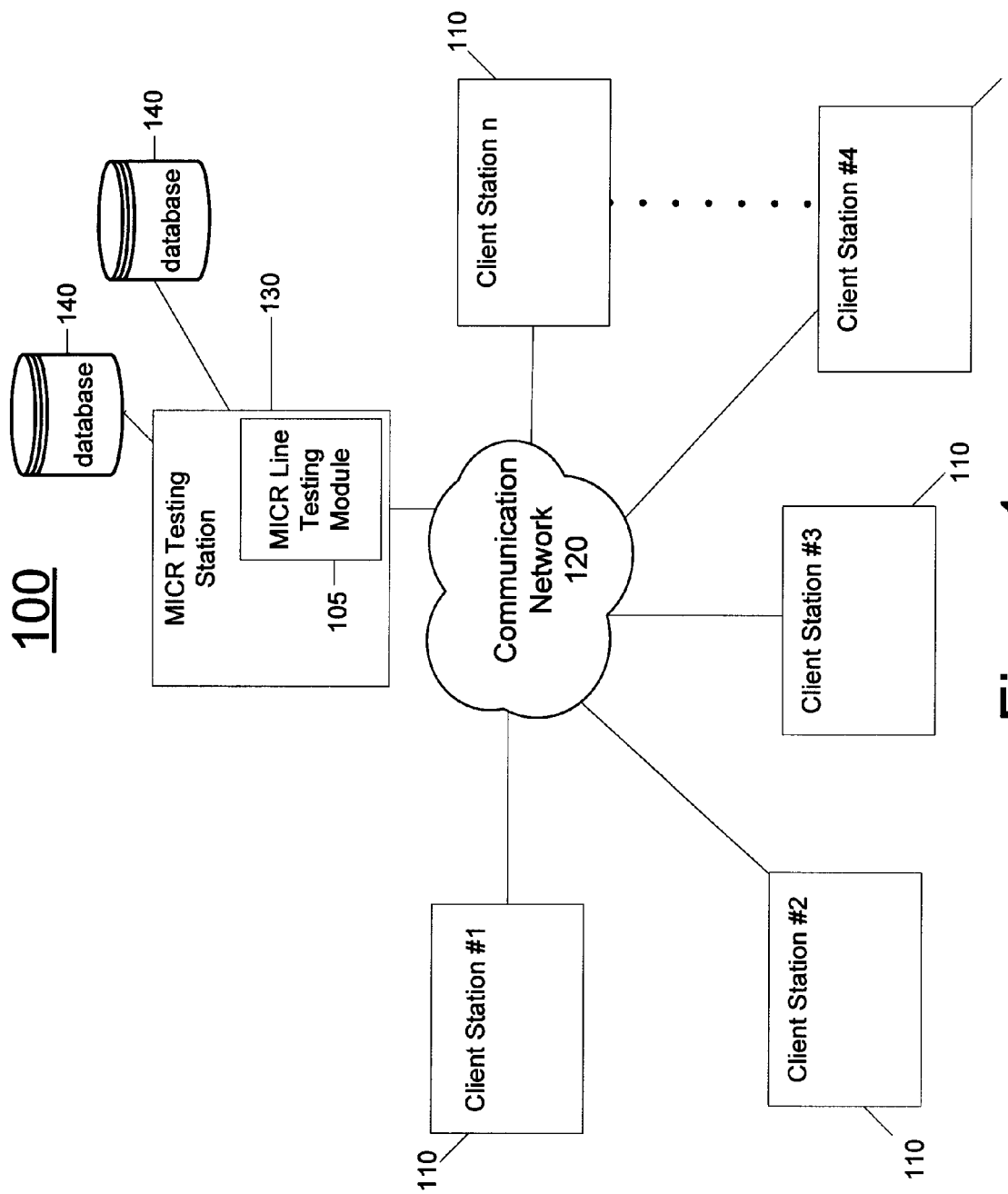
FIG. 1 is a block diagram illustrating a system for testing MICR lines, according to an exemplary embodiment.

Reference will now be made to illustrative embodiments of the invention(s) described herein, examples of which are illustrated in the accompanying drawings in which like reference characters refer to corresponding elements.

The present embodiments are described in relation to various systems and methods for enabling a user to test MICR lines in connection with the processing of checks. Nonetheless, the characteristics and parameters pertaining to the various embodiments of the systems and methods described herein may be applicable to test MICR lines in any context.

While the exemplary embodiments illustrated herein may show various embodiments (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system, for example. Thus, it should be appreciated that the components of the various embodiments may be combined into one or more devices (or modules) or collocated on a particular node of a distributed network, such as a telecommunications network, for example. As will be appreciated from the following description, and for reasons of computational efficiency, the components of the various embodiments may be arranged at any location within a distributed network without affecting the operation of the respective system(s).

According to the various embodiments, the systems and methods described herein enable a user (e.g., tester) to generate MICR transactions that simulate customer activity (including new functionality). These MICR transactions may be organized as decks which may then be used to conduct MICR testing to make sure MICR processing proceeds properly. For example, an administrator of a MICR sorting process, for example, may use the various systems and methods described herein to anticipate and test the accurate processing of transactions based on MICR.

The various systems and methods described herein present the following advantages/benefits: (1) the tool may make it easier to request a MICR deck by having informational online screens that will eliminate the need for detailed MICR knowledge; (2) drop downs and edits may prompt the user to build an error free deck; (3) the new system may allow the requestor to create the transactions closer the execution cycle allowing for retests; (4) the tool may allow the testers to reuse previous test decks from prior tests, reducing data entry time; (5) less time training may be required due to online training and job aids; (6) help screens may be available during execution with examples in detail as well as video demos (7) the line of business ("LOB") tester may be freed up to focus on testing their new code, not generating decks; (8) supervisors may not have to review, edit and correct test decks; (9) MICR procedure testers may receive their input accurately and in a timely manner for processing to enabling them to meet their processing schedule; (10) enable quick generation of MICR decks; (11) ability to enter data and then verify the processing results before the next set of input data is entered; (12) allow the requestor to request MICR in business language rather than in specific tran codes; (13) ability to generate the tran code in the correct format, such as by pulling together the account, script and MICR information; (14) ability to have manual control taken over by the automated tool; (15) eliminate one or more of the manual audits and controls that are currently in place; (16) ability to automate the process of creating and submitting MICR test decks which are used as test input for application testing during enterprise wide projects; and (17) enable testing for new enhancements.

FIG. 1 depicts an exemplary data processing environment or system 100 comprising one or more user or client stations 110, communications network 120, and one or MICR testing stations 130. As shown, client station 110 may connect to or communicate with MICR testing station 130 through any number of communication networks, such as communication networks 120, for example.

According to various embodiments, client station 110 may comprise a typical home or personal computer system where a user (e.g., tester) may interact with a network, such as the Internet, for example. Client station 110 may comprise or include, for instance, a personal or laptop computer. Client station 110 may include a microprocessor, a microcontroller or other general or special purpose device operating under programmed control. Client station 110 may also include a network-enabled appliance, a browser-equipped or other network-enabled cellular telephone, or another TCP/IP client or other device.

Client station 110 may be utilized by a tester, for example, to interact with MICR testing station 130 in connection with the creation, accessing, editing or modification of a MICR line or transaction that is part of a deck that may be used for testing MICR processing. In some embodiments, the tester may use client station 110 to provide MICR testing station 130 with particulars about a MICR line or transaction, such as bank name, application type, serial number, routing/transit number, account number, tran code, amount, or any other data or information that may be used to simulate customer credit or debit transactions.

MICR testing station 130 may enable the administration, control, and/or monitoring of the generation of test decks or that contain error-free MICR lines or transactions. In some embodiments, MICR testing station 130 may further comprise a terminal for an administrator of system 100. Such a terminal may be used, for example, to enable the administrator to control and oversee network operations, including but not limited to control and interaction between any client station 110 and MICR testing station 130.

MICR testing station 130 may comprise a single server or engine. In some embodiments, MICR testing station 130 may comprise a plurality of servers or engines, dedicated or otherwise, which may further host modules for performing desired system features and functionality. MICR testing station 130, for example, may comprise one or more modules that function to perform, control, administer, and/or direct the various MICR testing features and functionality described herein. MICR testing station 130 may include a MICR line testing module 105 for generating, accessing, revising or modifying MICR lines or transactions that comprise a MICR deck used in testing MICR processing. MICR testing station 130 may also include an administration module (not shown) for an agent of MICR testing station 130, for example, to input information related to MICR decks and MICR lines or transactions, for example. According to various embodiments, an agent of MICR testing station 130 may interface with a graphical user interface (or GUI) to MICR line testing module 105 to input necessary information and data.

Data and information maintained by MICR testing station 130 may be stored and cataloged in one or more databases 140 which may comprise or interface with a searchable database. For example, databases 140 may store data or information about particular MICR decks and corresponding parameters. For example, databases 140 may store decks by tester, deck name, capture site, event, cycle, predefined set, and/or date. Other parameters are possible. Databases 140 may also store MICR line or transaction particulars, such as bank name, application type, serial number, routing/transit number, account number, tran code, amount, for example. In addition, databases 140 may also store tables that enable the various systems and methods described herein to determine and identify parameters associated with a MICR line or transaction based on tester inputs, such as for example, application types, routing/transit number, and tran codes, for example. Databases 140 may comprise, include or interface to a relational database. Other databases, such as a query format database, a Standard Query Language (SQL) format database, a storage area network (SAN), or another similar data storage device, query format, platform or resource may be used. Databases 140 may comprise a single database or a collection of databases, dedicated or otherwise. In one embodiment, databases 140 may store or cooperate with other databases to store contextual information described herein.

Communications network 120 may comprise any type of communication network such as one able to transmit and receive data or information used by the various systems and methods described herein. Communications network 120 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. Communications network 120 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 120 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 120 may comprise a satellite communications network, such as a direct broadcast communication system (DBS) having the requisite number of dishes, satellites and transmitter/receiver boxes, for example. Communications network 120 may also comprise a telephone communications network, such as the Public Switched Telephone Network (PSTN). In another embodiment, communication network 120 may comprise a Personal Branch Exchange (PBX), which may further connect to the PSTN.

FIG. 1*a* illustrates a MICR deck 150 that is typical of the decks processed by the various systems and methods described herein. As shown, deck 150 comprises four MICR lines or transactions that may simulate customer credit or debit transactions. In some embodiments, a MICR line or transaction may comprise various parameters, including, for example, a bank name/number, application type, serial number, routing/transit number, account number, tran code and/or amount. In some embodiments, some of the parameters are provided by the tester, while others are determined by the various systems and methods described herein. For example, the various systems and methods described herein may determine the application type parameter based on the tester's selection of a bank name. In some embodiments, such determination may be based on predefined rules or tables that may be stored in databases 140, for example. Other parameters may be determined by the tester or by the various systems and methods described herein.

Figure 2:
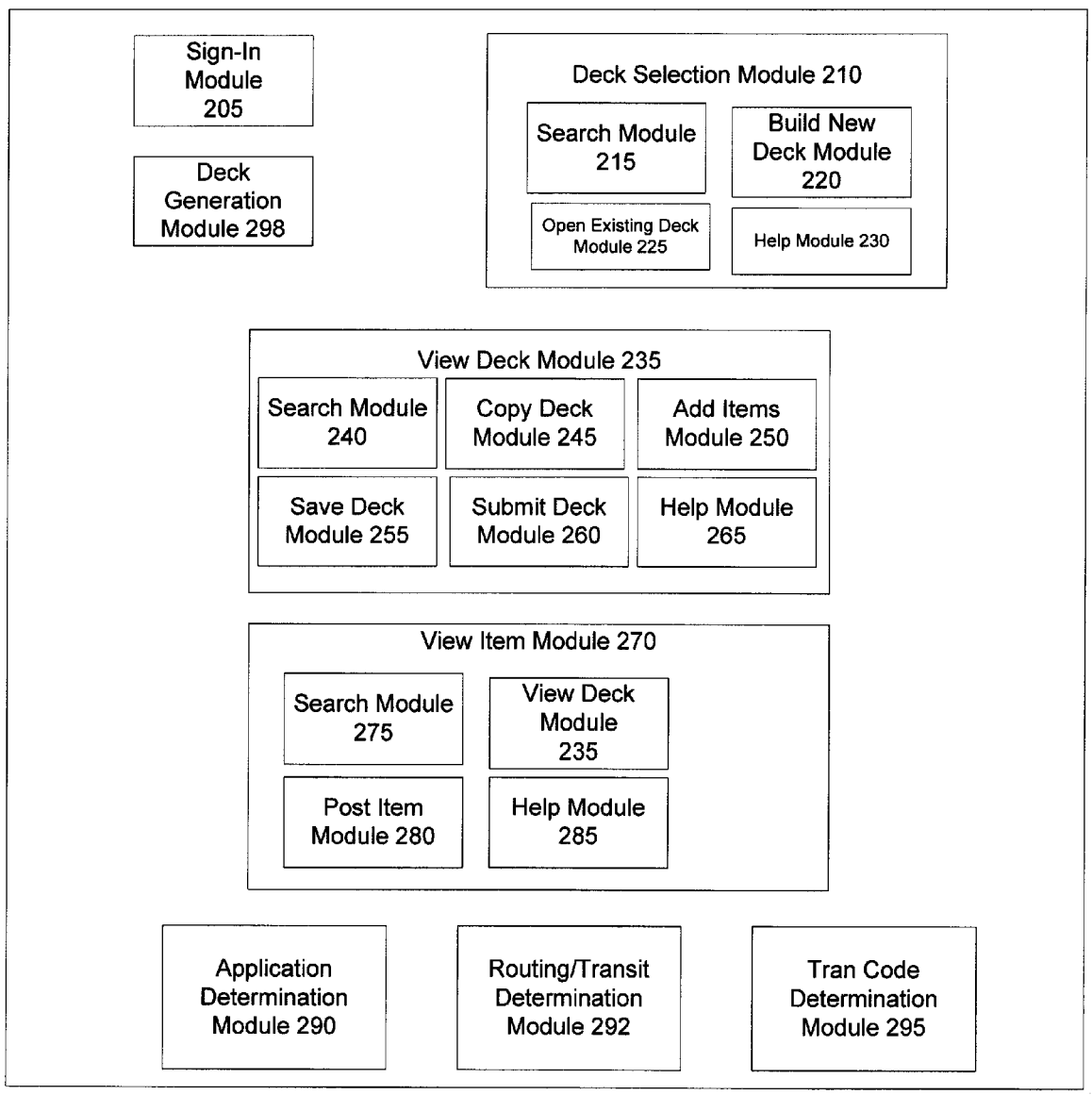
FIG. 2 is a block diagram illustrating exemplary modules associated with a MICR testing station 105, according to an exemplary embodiment.

FIG. 2 illustrates various exemplary modules associated with MICR line testing module 105, according to some embodiments. In some embodiments, MICR lines testing module 105 enables a tester to selectively create, access, revise, or modify MICR decks used to test MICR processing, and more specifically create, access, revise or modify MICR lines or transactions that are comprise the MICR deck. In some embodiments, the various modules may be accessed through any number of graphical user interface(s) that enable a user to provide and receive data or information. As shown, the following modules may be provided: (1) deck selection module 210; (2) view deck module 235; (3) application determination module 290, (4) routing/transit determination module 292; and (5) tran code determination module 295. Each is described below:

Deck selection module 205 may, in some embodiments, enable a tester to select a particular MICR deck to create, access, revise or modify. In some embodiments, deck selection module 205 may further comprise additional modules for selecting decks: a search module 215, a build new deck module 220, and an open existing deck module 225. For example, interfacing with search module 215, a tester may conduct a search of the various decks stored in databases 140. Such a search may be conducted by tester name (e.g., the tester that created the deck), deck name, capture site (e.g., the site or location where the deck was printed), event (e.g., a project currently participating in testing to be brought to production or a past or future scheduled project lined up for testing before being brought into production), cycle (e.g., the timeframe within an event that certain tasks may be completed; there may be multiple cycles per event) predefined set (e.g., a listing of numbers and codes that may have already been placed in the MICR tool drop down boxes for users to select from based on the area being completed by the tester), and date range. A tester may also interface with build new deck module 220 to create a new deck by providing deck particulars, such as deck name, bank number, application type, serial number, routing/transit number, account number, tran code, and amount, for example. Open existing deck module 225 may be used to open any decks that are associated with a MICR line or transaction the tester is currently working on. In some embodiments, each of the above modules may generate appropriate interfaces (e.g., graphical user interfaces (or "GUIs")) that enable the tester, for example, to easily provide and obtain data or information relating to the MICR lines or transactions or MICR decks. In some embodiments, a help module 230 may be provided to assist the tester with use of deck selection module 210.

View deck module 235 may, in some embodiments, be used to view particulars of a MICR deck selected by deck selection module 210, for example. In some embodiments, view deck module 235 may further comprise additional modules for viewing decks, such as: a search module 240, a copy deck module 245, an add items module 250, a save deck module 255, and a submit deck module 260. For example, interfacing with search module 215, a tester may conduct a search of the line or transactions within a specific deck. Such a search may be conducted by any of the line or transaction parameters, such as bank number, application type, serial number, routing/transit number, account number, tran code, and amount, for example. A tester may also interface with a copy deck module 245 to create a copy of the deck being viewed or any designated deck, for example. Add items module 250 may be used to add lines or transactions to a deck. For example, a tester may add new lines or transactions to an existing deck corresponding to credit or debit transactions. Save deck module 255 may be used to save a particular deck once one or more particulars of its lines or transactions have been entered. In some embodiments, decks may be stored in database 140, for example, for subsequent access and use. Submit deck module 260 may be used to submit a deck for processing in connection with testing of MICR procedures. For example, a completed deck may be printed (e.g., in the form of individual checks or transactions) and submitted to sorters and routers for processing and to identify one or more possible errors. In some embodiments, each of the above modules may generate appropriate interfaces that enable the tester, for example, to easily provide and obtain data or information relating to the MICR lines or transactions or MICR decks. In some embodiments, a help module 265 may be provided to assist the tester with use of view deck module 235.

View item module 270 may, in some embodiments, be used to view particulars of a MICR line or transaction with a deck selected by deck selection module 210, for example. In some embodiments, view item module 270 may further comprise additional modules for viewing lines or transactions, such as: a search module 275, view deck module 235, and a post item module 280. Search module 215 may be used to conduct a search of a line or transaction within a deck. From within view item module 270, a tester may also interface with a view deck module 235 to view one or more of the other lines or transactions associated with the deck. Post item module 280 may be used to add lines or transactions to a deck. In some embodiments, items are posted to a deck which may then be stored in database 140, for example, for subsequent access and use. In some embodiments, each of the above modules may generate appropriate interfaces that enable the tester, for example, to easily provide and obtain data or information relating to the MICR lines or transactions or MICR decks. In some embodiments, a help module 285 may be provided to assist the tester with use of view item module 270.

Sign-in module 205 may, in some embodiments, enable a tester to sign-in to MICR testing station 130 to access the various features and functionality described herein. In some embodiments, signing in may involve entering an authorized user name and password, for example. In some embodiments, sign-in module 205 may ensure that only authorized personnel are granted permission to access and utilize the various features and functionality described herein. For example, only select members of a team may be permitted to create, edit or revise MICR lines or transactions that may comprise a part of a deck to be used in MICR testing procedures.

Application determination module 290 may, in some embodiments, determine application types that may relate to a particular bank that a tester has designated in connection with creating, accessing, revising or modifying a MICR line or transaction. In some embodiments an application may refer to the particular deposit/withdrawal or loan systems that a particular bank has implemented. Thus, if a tester specifies a particular bank in connection with a new or revised line or transaction or deck, application determination module 290 may process the selection and identify all application types that correspond to the bank. In some embodiments, all application types that correspond to the bank may then be presented to the tester for selection. In some embodiments, application types may be presented in a drop down menu that the tester may then scroll to identify the desired application type.

Routing/transit determination module 292 may, in some embodiments, determine routing/transit numbers that may relate to a particular bank and/or application type that a tester has designated in connection with creating, accessing, revising or modifying a MICR line or transaction. Thus, if a tester specifies a particular bank and application type in connection with a new or revised line or transaction or deck, routing/transit determination module 292 may process the selection(s) and identify one or more routing/transit numbers that correspond to the bank and/or application type. In some embodiments, one or more routing/transit numbers that correspond to the bank and/or application type may then be presented to the tester for selection. In some embodiments, routing/transit numbers may be presented in a drop down menu that the tester may then scroll to identify the desired routing/transit number.

Tran code determination module 295 may, in some embodiments, determine a tran code that relates to a particular routing/transit number that a tester has designated in connection with creating, accessing, revising or modifying a MICR line or transaction. Thus, if a tester specifies a particular routing/transit number in connection with a new or revised line or transaction or deck, tran code determination module 295 may process the selection and identify a tran code number that corresponds to the routing/transit number. In some embodiments, one or more tran codes that correspond to the routing/transit number may be presented to the tester for selection. In some embodiments, tran codes may be presented in a drop down menu that the tester may then scroll to identify the desired routing/transit number. In some embodiments, tran code determination module 295 may auto-populate the line or transaction with the appropriate tran code.

Deck generation module 298 may, in some embodiments, generate particular documents with MICR lines or transactions that have been created, revised or modified using the various systems and methods described herein. In some embodiments, the documents generated may be printed at an associated printer and may be submitted for processing by sorters and routers for testing purposes. In some embodiments, the documents generated and printed may resemble checks that simulate customer credit or debit transactions. In some embodiments, a tester may interface with deck generation module 298 and specify, via appropriate interfaces, which lines or transactions or decks may be generated and printed.

Exemplary methods that may be performed by the various systems described above will now be discussed. In some embodiments, the methods described herein may be performed by system 100, and more specifically MICR line testing module 105.

Figure 3:
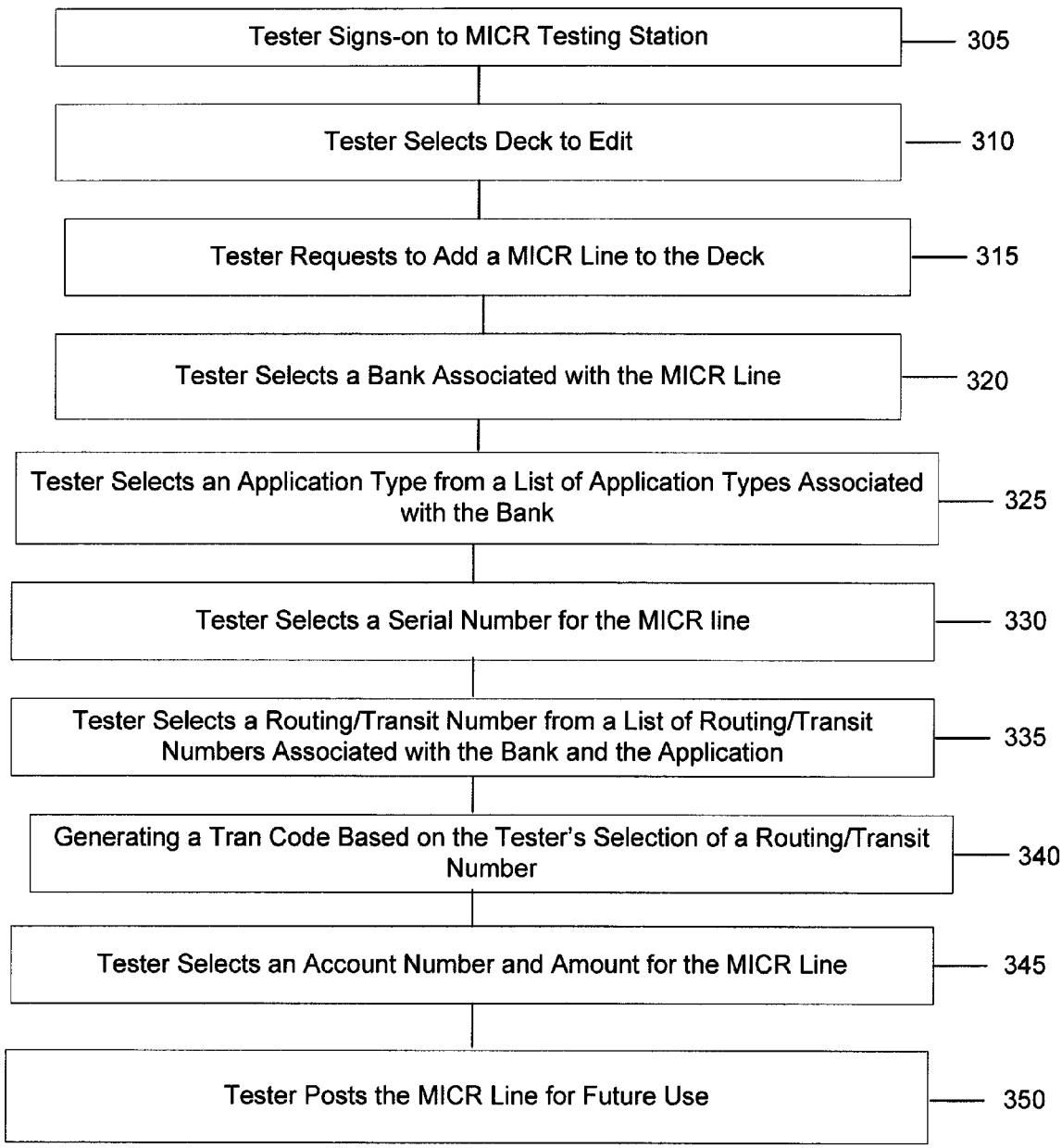
FIG. 3 illustrates a method 300 for testing a MICR line, according to an exemplary embodiment.

FIG. 3 illustrates one embodiment of a method 300 for crating, accessing, revising or modifying a deck, according to one embodiment of the systems and methods described herein. At step 305, a tester may sign on to MICR testing station 130. In some embodiments, the tester may provide an appropriate username and password to verify access rights. At step 310, the tester may specify a particular deck the tester would like to create, edit or revise. At step 315, the tester may request to add a line or transaction to the deck. In some embodiments, the tester may so specify by initiating an add item icon that may be related with add items module 250, for example. At step 320, the tester may select a bank name or number associated with the line or transaction the tester is creating or adding. In some embodiments, application determination module 290 may determine at least one application type that corresponds to the bank name or number that was selected by the tester. At step 325, the tester may select an application type from the list of application types that the application determination module 290 has identified as corresponding to the selected bank. In some embodiments, the application type may be selected from a drop down menu.

At step 330, the tester may select a serial number for the line or transaction. At step 335, the tester may select a routing/transit number for the line or transaction. In some embodiments, the routing/transit number may be selected from a group of routing/transit numbers that routing/transit number determination module 292 has determined as corresponding to the bank and/or application type selected by the tester. In some embodiments, the application type may be selected from a drop down menu. At step 340, tran code determination module 295 may determine a corresponding tran code based on the routing/transit number selected by the tester. In some embodiments, tran code determination module 295 may auto-populate the parameter of the line or transaction with the appropriate tran code. At step 345, the tester may select an account number and/or a transaction amount for the line or transaction. At step 350, the tester may post the line or transaction as part of a MICR deck for future use in testing MICR processing.

Figure 4:
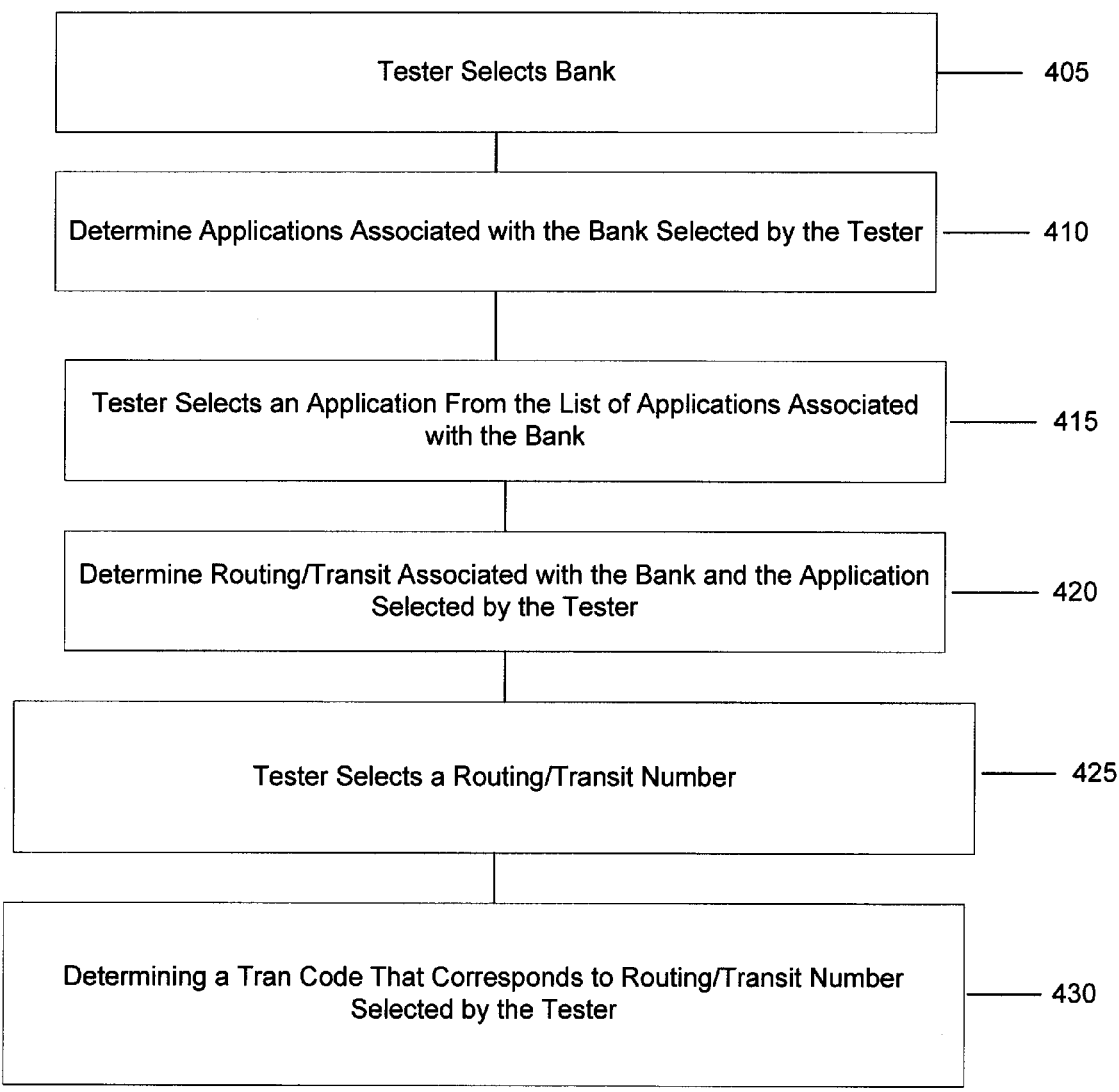
FIG. 4 illustrates a method 400 for testing a MICR line, according to an exemplary embodiment.

FIG. 4 illustrates one embodiment of a method 400 for determining parameters of a MICR line or transaction, according to an embodiment of the systems and methods described herein. At step 405, a bank selection signal may be received from a tester selecting a bank associated with a MICR line transaction. At step 410, at least one related application associated with the bank selected by the tester may be identified. In some embodiments, the at least one related application may be determined by application determination module 290 associated with MICR testing station 130. At step 415, an application selection signal may be received from the tester selecting an application associated with the MICR line transaction. In some embodiments, the application is selected from the at least one related application determined to be associated with the bank. At step 420, at least one related routing/transit number associated with the bank and/or the application selected by the tester may be identified. In some embodiments, the at least one related routing/transit number may be determined or identified by routing/transit number determination module 292 associated with a MICR testing station 130.

At step 425, a routing/transit number selection signal may be received from the tester selecting a routing/transit number associated with the MICR line transaction. In some embodiments, the routing/transit number is selected from the at least one related routing/transit number determined to be associated with the bank and/or the application. At step 430, a tran code that corresponds to the routing/transit number selected by the tester may be determined. In some embodiments, the tran code is determined by a tran code determination module 295 associated with MICR testing station 130.

FIGS. 5-9 illustrate various interfaces that a user interacting with MICR testing station 130 and more particularly MICR line testing module 105 to conduct testing of MICR lines or transactions, such as demonstrated by methods 300 and 400 of FIGS. 3 and 4, respectively.

Figure 5:
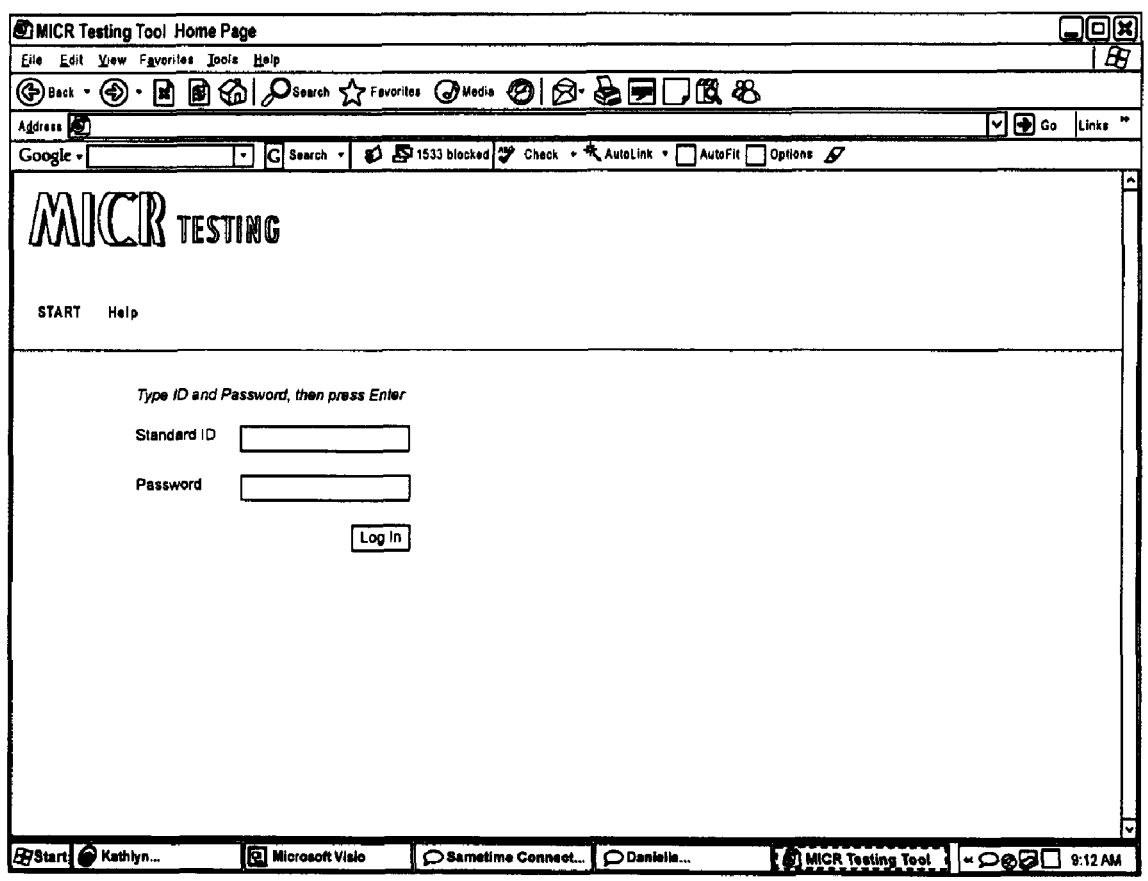
FIG. 5 illustrates an interface 500 of system 100 for testing MICR lines, according to an exemplary embodiment.

FIG. 5 illustrates an Interface 500 for testing MICR lines, according to an embodiment of the systems and methods described herein. Interface 500 may comprise a sign-in screen where an authorized user may access the features and functionality of MICR Testing Station 205 by entering the user name and password, for example. In some embodiments, Interface 500 may ensure that only authorized personnel are granted permission to access and utilize the various features and functionality described herein. For example, only select members of a team may be permitted to create, edit or revise MICR line transactions that may comprise a part of a deck to be used in MICR testing procedures. In some embodiments, Interface 500 may request any data or information that may be used to identify or authenticate a user.

Figure 6:
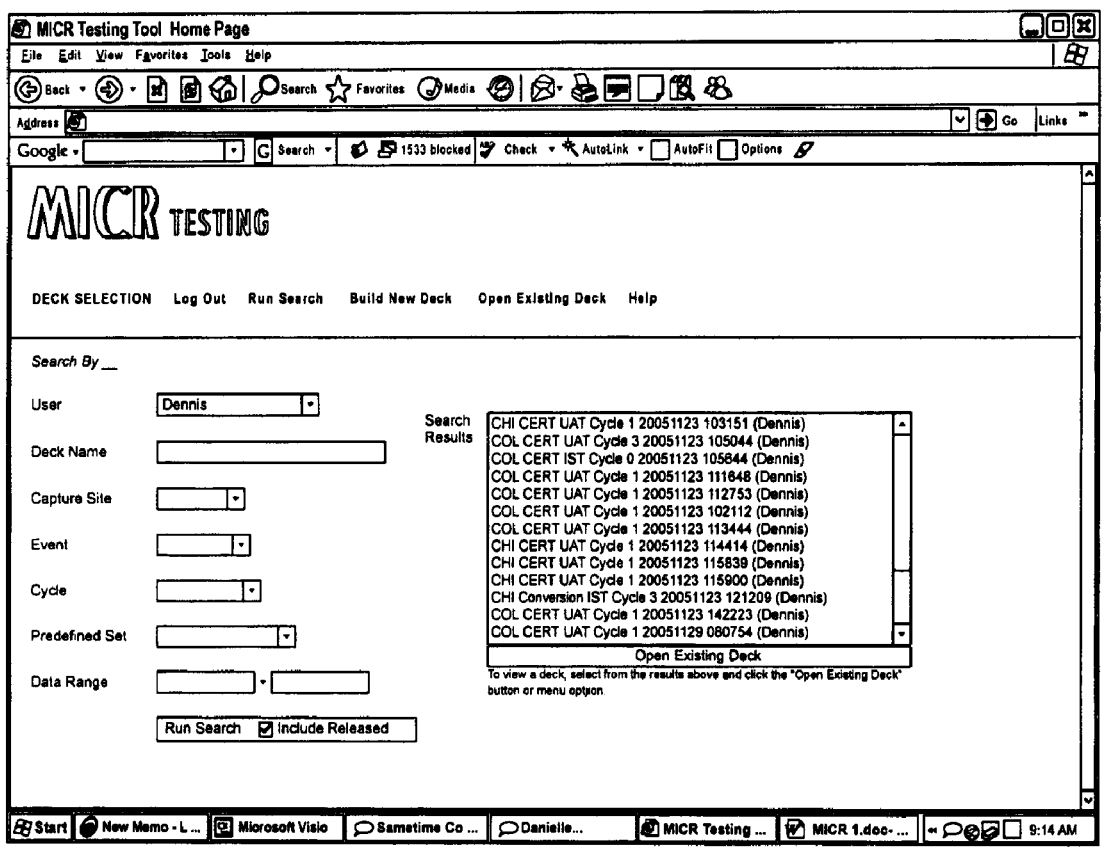
FIG. 6 illustrates an interface 600 of system 100 for testing MICR lines, according to an exemplary embodiment.

FIG. 6 illustrates an Interface 600 that may correspond to a deck selection screen. As shown, Interface 600 may comprise icons for logging out, running a search, building a new deck, opening an existing deck, and a help icon. In some embodiments Interface 600 may enable a tester, for example, to identify and select a deck that will either be created, edited, revised, or modified. In some embodiments, a tester may select a deck for creation or modification by searching for such a deck by user, deck name, capture size, event, cycle, predefined set, or date range. The tester may populate any of the above enumerated parameters and conduct a search based on said parameters. Any search results resulting from such a search may be posted under search results as shown in Interface 600. The user may then initiate any of the search results that appear by clicking open existing deck as shown. In so doing, the tester may call up the particulars of the corresponding deck selected.

Figure 7:
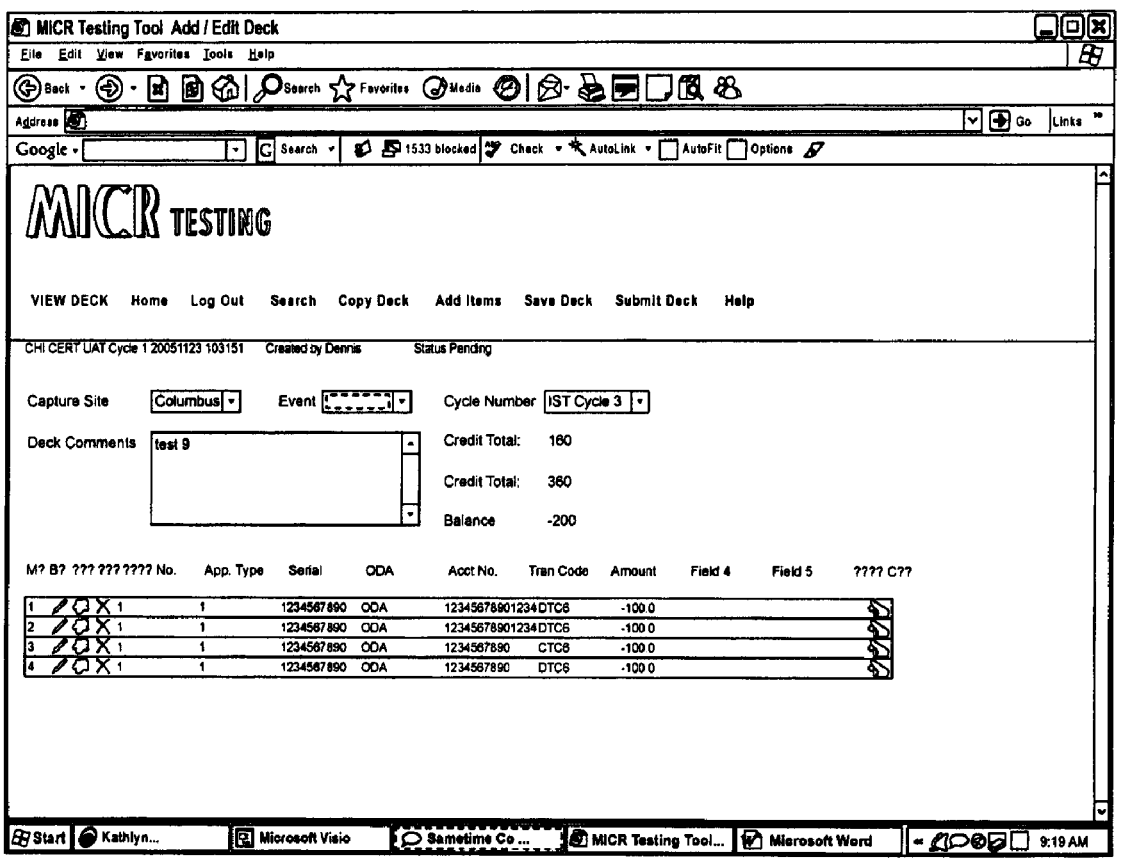
FIG. 7 illustrates an interface 700 of system 100 for testing MICR lines, according to one embodiment of the invention.

FIG. 7 illustrates an Interface 700 that may correspond to a view deck module as described herein. Some embodiments, Interface 700 may appear once a tester selects a deck as described above in connection with FIG. 6. For example, as shown on Interface 700 the corresponding deck selected by a tester is designated "CHI CERT UAT Cycle 1 20051123 103151." Also shown on Interface 700 are particulars of such a deck such as the number of transactions in the deck, the bank number for each of those transactions as well as the application type, serial number, routing transit number, account no., corn code, amount and item comments. Also shown on Interface 700 are various parameters that a tester may initiate in working with the selected deck. For example, the tester may designate a capture site, an event, a cycle number, provide comments. Some embodiments, Interface 700 may further specify a credit total, a debit total and a balance associated with the various deck transactions. As shown, the credit total $160 is based on the various credits shown in the four transactions listed below. Similarly, the debit total $360 is the amount of debits as shown on the four transactions listed below. The balance is, of course, the sum of these two amounts and is shown as being –$200.

Interface 700 also provides the tester with various icons that can be initiated to perform select features or functionality. For example, the tester may log out, conduct a search, copy the selected deck, add additional items or transactions to the deck, save the deck, or submit the deck for future use in MICR testing procedures.

Figure 8:
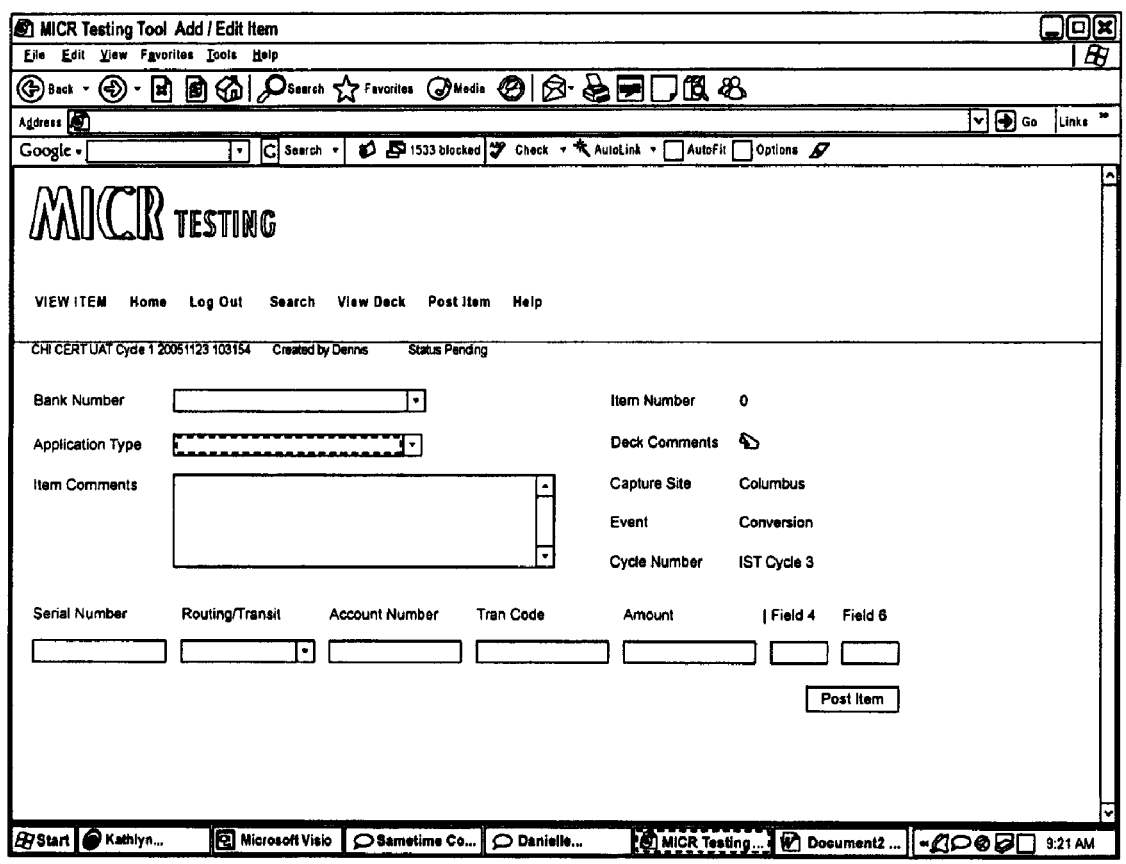
FIG. 8 illustrates an interface 800 of system 100 for testing MICR lines, according to one embodiment of the invention.

FIG. 8 illustrates an Interface 800 that may correspond to a view item screen that may appear following a testers initiation of the add items icon shown on Interface 700 of FIG. 7. In some embodiments, such initiation of an add items icon designates a tester's desire to add an item or transaction to a selected deck. Thus, the tester may wish to add additional transactions to the four that are currently shown as listed on Interface 700, for example. Some embodiments, entering additional items or transactions may comprise providing a bank number associated with the transaction and application type item of transaction comments as well as a serial number, a routing transit number, an account number, a TRAN code, an amount and any other data or information that may be required. In some embodiments, the tester may provide such information via drop-down menus as shown, for example, in connection with the bank number, application type and the routing transit number.

In some embodiments, once a tester designates a particular bank number, the various systems and methods described herein may determine at least one application type that may be associated with the selected bank number. For example, as shown, the tester has selected JPMorgan Chase Bank, N.A. of Ohio as the corresponding bank of the audit transaction. Responding thereto, the various systems and methods described herein may generate a listing of at least one application type that is associated with JPMorgan Chase N.A. of Ohio. In some embodiments, such a list may be included in the drop-down menu designated along side of application type. The tester may then select from the provided drop-down menu the corresponding application type that he or she would like associated with the added transaction.

The tester may also designate a serial number that corresponds to the added transaction as well as a routing transit number. In some embodiments the routing transit number may be selected from a list of relevant routing transit numbers that may be generated by various systems and methods described herein based on the bank number selected and/or the application type selected by the tester. In some embodiments, the various systems and methods described therein may also determine corresponding tran code number based on the routing transit number ultimately selected by the tester. Such a tran code number may be then automatically populated on Interface 800 where shown. In some embodiments, a tester may also provide an account number as well as an amount that are to be associated with the transaction being added. Once all particulars of the added transactions have been provided, the tester may then post the item of transaction onto the deck for future use in MICR testing procedures.

Figure 9:
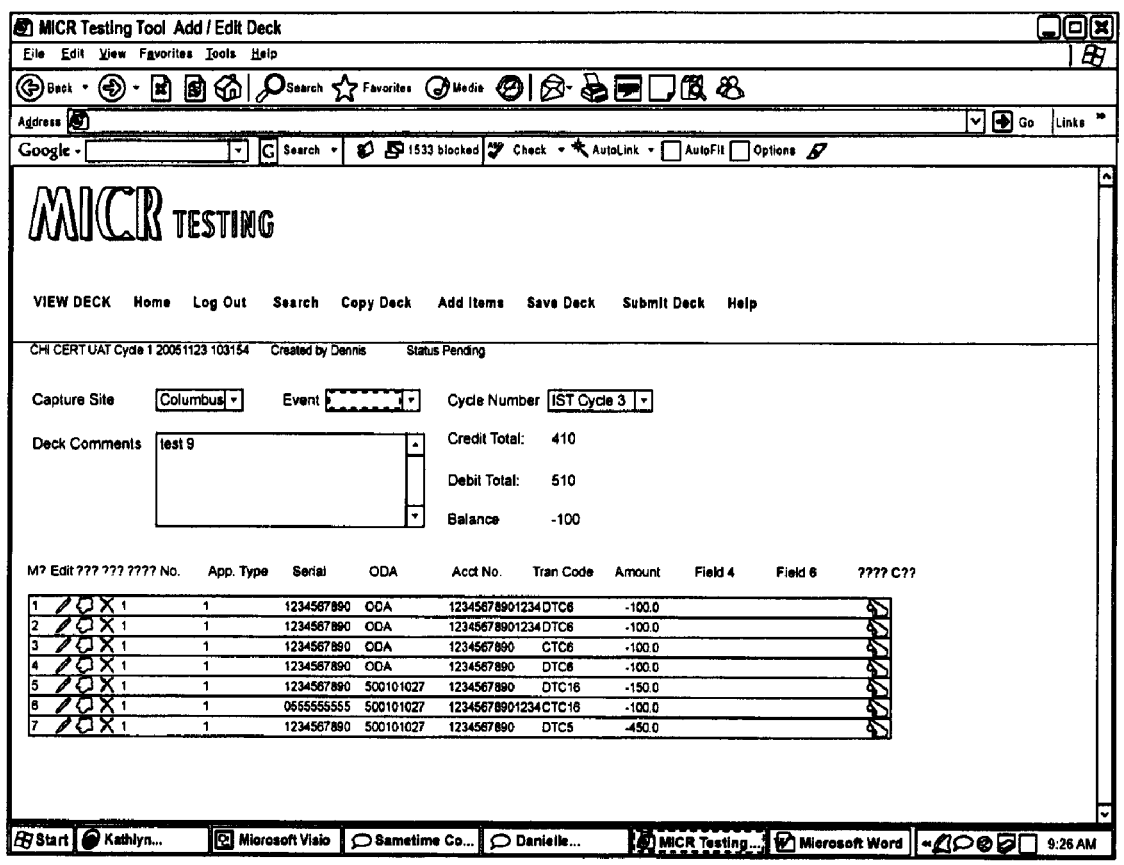
FIG. 9 illustrates an interface 900 of system 100 for testing MICR lines, according to one embodiment of the invention.

FIG. 9 illustrates an Interface 900 that illustrates the various transactions that were added via Interface 800. In comparison to Interface 700 of FIG. 7, Interface 900 now includes 3 additional transactions that were added according to the procedures set forth above in connection with FIG. 8. As shown, Interface 900 includes new added transactions 5, 6, and 7. The effect of these three added transactions on the credit total is an increase of $250. Its effect on the debit total is a decrease of $150, and the effect on the overall balance is +$100. In some embodiments, the deck shown as revised with the three new transactions may then be saved by the tester for future use in MICR testing procedures.

Other embodiments, uses and advantages of the present invention will be apparent to those skilled in the art from consideration of the specification and practice of the invention disclosed herein. The specification and examples should be considered exemplary only.

The invention claimed is:

1. A system for accessing and generating documents for use in MICR line testing, comprising:
    a Magnetic Ink Character Recognition ("MICR") testing station for testing MICR processing, the MICR testing station comprising:
    a MICR line testing module, communicatively coupled to a computer processor of the MICR testing station, configured for generating at least one MICR testing document for use in testing MICR processing, the MICR line testing module further comprising: an application determination module for determining an application based on a bank selection provided by a tester, a routing/transit number determination module for determining a routing/transit number based on the bank and the application determined, a tran code determination module for determining a tran code based on the routing/transit number determined, and a deck selection module for selecting a deck to create or revise, wherein the deck selection module comprises a search module for searching existing decks, a build new deck module for creating a new deck, and an open existing deck for opening and revising, modifying or editing an existing deck; and
    at least one client station connected to the MICR testing station via a communications network, the at least one client station being used by at least one tester to provide particulars about at least one MICR line.

2. The system of claim 1 wherein the MICR line testing module further comprises a view deck module for viewing selected decks.

3. The system of claim 2 wherein the view deck module further comprises a search module for searching existing decks, a copy deck module for copying an existing deck, an add items module for adding transactions to a deck, a save deck module for saving a deck, and a submit deck module for submitting a deck for MICR testing.

4. The system of claim 1 wherein the MICR line testing module further comprises a view item module for viewing at least one transactions within a deck.

5. The system of claim 4 wherein the view item module further comprises a search module for searching existing decks, a view deck module for viewing at least one deck associated with the at least one transaction, and a post item module for posting the at least one transaction to the deck.

6. The system of claim 1 wherein the at least one MICR testing document comprises a deck.

7. The system of claim 6 wherein the deck comprises at least one credit or debit transaction simulating customer activity.

8. A method for accessing data to generate at least one transaction comprising part of at least one document for use in MICR testing, comprising:
    receiving a bank selection instruction from a tester selecting a bank associated with a MICR line transaction;
    determining at least one related application associated with the bank selected by the tester, the at least one related application being determined by an application determination module associated with a MICR testing station;
    receiving an application selection instruction from the tester selecting an application associated with the MICR line transaction, the application being selected from the at least one related application determined to be associated with the bank;
    receiving an account selection instruction from the tester selecting an account number associated with the MICR line transaction;
    receiving a credit or debit amount selection instruction from the tester selecting a credit or debit amount associated with the MICR line transaction;
    determining at least one related routing/transit number associated with the bank or the application selected by the tester, the at least one related routing/transit number being determined by an routing/transit number determination module associated with a MICR testing station;
    receiving a routing/transit number selection instruction from the tester selecting a routing/transit number associated with the MICR line transaction, the routing/transit number being selected from the at least one related routing/transit number determined to be associated with the bank or the application;
    determining a tran code that corresponds to the routing/transit number selected by the tester, the tran code being determined by an tran code determination module associated with a MICR testing station; and associating the tran code with the MICR line transaction.

9. The method of claim 8 further comprising the step of receiving a post instruction from the tester providing an instruction to post the MICR line transaction for use in MICR testing procedures.

10. The method of claim 8 wherein the MICR line transaction simulates a credit or debit transaction of a customer.

11. A system for accessing and generating documents for use in MICR line testing, comprising:

a MICR testing station for testing MICR processing, the MICR testing station comprising:

a MICR line testing module for generating at least one MICR testing document for use in testing MICR processing, the MICR line testing module further comprising:

(1) an application determination module for determining an application based on a bank selection provided by a tester, (2) a routing/transit number determination module for determining a routing/transit number based on the bank and the application determined, and (3) a tran code determination module for determining a tran code based on the routing/transit number determined, (4) a deck selection module for selecting a deck to create or revise, wherein the deck selection module further comprises a search module for searching existing decks, a build new deck module for creating a new deck, and an open existing deck for opening and revising, modifying or editing an existing deck, (5) a view deck module for viewing selected decks, wherein the view deck module further comprises a search module for searching existing decks, a copy deck module for copying an existing deck, an add items module for adding transactions to a deck, a save deck module for saving a deck, and a submit deck module for submitting a deck for MICR testing, (6) a view item module for viewing at least one transactions within a deck, wherein the view item module further comprises a search module for searching existing decks, a view deck module for viewing at least one deck associated with the at least one transaction, and a post item module for posting the at least one transaction to the deck; and at least one client station connected to the MICR testing station via a communications network, the at least one client station being used by at least one tester to provide particulars about at least one MICR line.

12. The system of claim 11 wherein the at least one MICR testing document comprises a deck.

13. The system of claim 12 wherein the deck comprises at least one credit or debit transaction simulating customer activity.

14. The method of claim 12 wherein the deck comprises at least one MICR line transaction simulating a credit or debit transaction of a customer.

15. The method of claim 12 wherein the communications network comprises the Internet.

16. The method of claim 12 wherein the at least one MICR testing document comprises a spreadsheet.

* * * * *